Figure 1:
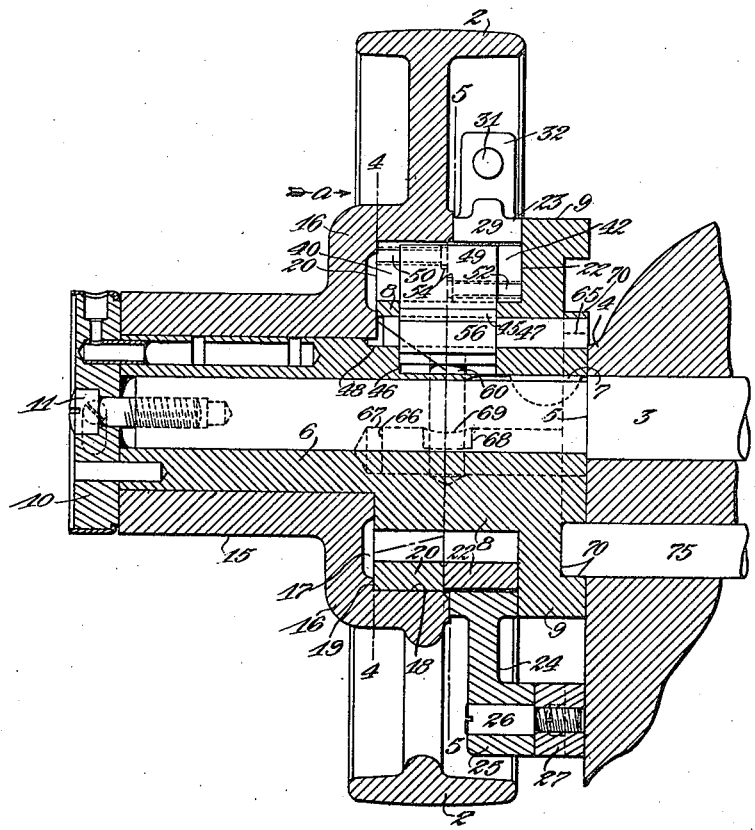

May 27, 1924.

A. H. MAYNARD

CLUTCH AND BRAKE DEVICE

Filed Oct. 26, 1920

1,495,342

2 Sheets-Sheet 2

Inventor:
Arthur H. Maynard
By
Arthur A. —————
Attorney.

Patented May 27, 1924.

1,495,342

UNITED STATES PATENT OFFICE.

ARTHUR H. MAYNARD, OF WARWICK, RHODE ISLAND, ASSIGNOR TO BOSTON WIRE STITCHER COMPANY, OF PORTLAND, MAINE, A CORPORATION OF MAINE.

CLUTCH AND BRAKE DEVICE.

Application filed October 26, 1920. Serial No. 419,598.

*To all whom it may concern:*

Be it known that I, ARTHUR H. MAYNARD, a citizen of the United States, residing at Warwick, in the county of Kent, State of Rhode Island, have invented certain new and useful Improvements in Clutch and Brake Devices, of which the following is a specification.

My invention relates to improvements in clutch- and brake-devices for power-operated machines.

One object of the invention is to provide a clutch-device for connecting two elements to be driven one from the other while allowing for a quick release of the driven-element.

Another object of the invention is to provide means for releasing the driven-element from the driving-element at a predetermined point in its rotation.

Another object of the invention is to provide braking-means for arresting the operation of the driven-element immediately upon its release.

Another object of the invention is to provide a construction in which the clutch- and brake-devices are self-contained and interdependent.

Another object of the invention is to provide a mechanism of compact arrangement having a minimum number of parts and proof against derangement or getting out of order.

Figure 2:
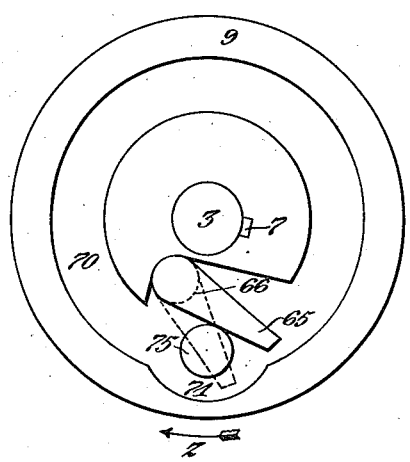
Figure 4:
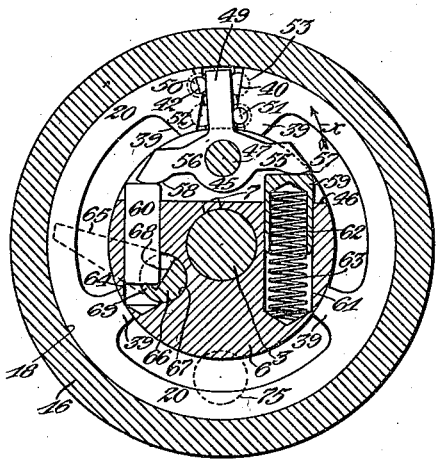
Figure 3:
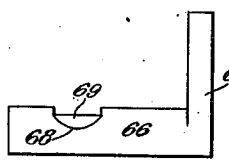
Figure 5:
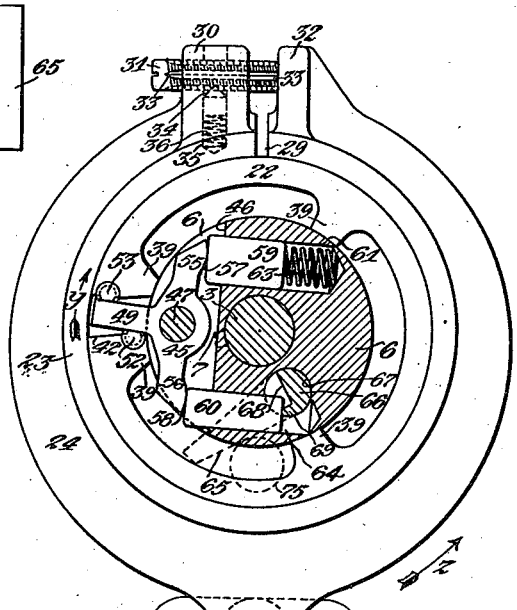

Further objects of the invention will appear from the description of a preferred embodiment thereof as set forth in the following specification and illustrated in the accompanying drawings. In the drawings:

Fig. 1 is a longitudinal sectional view of one embodiment of my improved clutch- and brake-device, taken on its central axis and illustrating it as applied to use with a driving-pulley and a shaft to be driven therefrom;

Fig. 2, an end view of the power-transmission hub or clutch-sleeve of the device, showing the pawl which operates the clutch-releasing mechanism;

Fig. 3, a detail view of the clutch-releasing pawl;

Fig. 4, a transverse sectional view of the device taken on the line 4—4 of Fig. 1, looking in the direction indicated by arrow *a;* and Fig. 5, a similar sectional view taken on the line 5—5 of Fig. 1, looking in the same direction.

Referring first to Fig. 1, I have herein illustrated my improved clutch- and brake-device as applied to use in transmitting power between a driving-pulley 2 and a shaft 3, and for checking the rotation of the shaft when the latter is disconnected from the pulley. It is to be understood, however, that my invention is adapted for other methods of use with different types of driving- and driven-members as employed in various kinds of machines.

As before stated, my improved device is designed to control the stopping of the driven-member at a predetermined point in its operation and for this reason is particularly adapted for use with such apparatus as wire-stitching or stapling machines, eyeletting machines, drop-presses or the like. In this class of apparatus it is desirable to arrest the operation of the reciprocating parts of the machine at a certain position in their stroke: for instance, in stapling machines it is required to stop the machine with the staple-driver raised above the work; and in a drop-press it is preferable to stop the machine when the punch is in raised position above the die. My invention is especially adapted for such uses, but it is to be understood that its principle of operation is also applicable to other purposes and therefore I do not wish to limit myself to the exact embodiment of the invention as herein shown and described.

In Fig. 1, the shaft 3, which in this embodiment constitutes the driven-member, is shown as journaled in a bearing 4 constructed as a part of the frame of the machine to which the device is applied, or the bearing might be a portion of a hanger or other supporting means. A portion of the shaft 3 projects outwardly beyond the bearing 4 and is reduced in diameter to form a shoulder 5. Fitted to the reduced portion of the shaft 3 is an elongated sleeve 6 arranged with its inner end abutting the shoulder 5 and the face of the bearing 4. The sleeve 6 constitutes the power-transmitting element of the clutch-device and is keyed to the shaft 3 at 7 to adapt it to drive the latter.

At its inner end the sleeve 6 is formed with an enlarged hub 8 carrying a disk or flange 9 which abuts the end of the bearing 4. Fastened to the outer end of the shaft 3 is a disk or cap 10 which abuts the end of the sleeve 6 to hold it in position longitudinally of the shaft. The cap 10 may be secured to the end of the shaft 3 by any suitable means such as the axial screw 11, the head of which is countersunk into the face of the cap. The cap 10 also serves to retain the driving-pulley 2 in place on the sleeve 6 and further, as a means for introducing lubricant to the running parts of the mechanism, but as this latter function is not essential to the present invention the detail of the arrangement is not herein described.

The driving-element 2, which as herein illustrated consists in a belt-pulley, is mounted free to rotate on the sleeve 6 and is adapted to be connected therewith to drive the shaft 3. As shown in Fig. 1, the pulley 2 is constructed with an elongated, offset hub 15 bored to receive the reduced portion of the sleeve 6 and with its inner end abutting the side of the hub 8 on the sleeve. The outer end of the hub 15 abuts the side of the cap 10 which, as before mentioned, holds the pulley 2 in place on the sleeve 6. At its right-hand end the hub 15 of the pulley 2 is formed with a cup-shaped enlargement 16 which is bored at 17 to provide an annular clutch-face 18 arranged concentric with the enlarged hub 8 of the sleeve 6. The clutch-face 18 is adapted to be frictionally engaged by an expansible split clutch-ring 20, see Fig. 4, to be later described.

At the side of the clutch-ring 20 is a brake-ring 22 of the same construction, see Fig. 5, adapted to expand against the internal face of a fixed brake-annulus 23 arranged between the side of the clutch-annulus of the pulley 2 and the face of the flange or disk 9 on the clutch-sleeve 6. Referring to Fig. 1, the clutch-ring 20 and brake-ring 22 are held in place laterally between a shoulder 19 on the clutch-annulus 18 and the side of the flange 9 on the sleeve 6.

As shown more particularly in Fig. 5, the brake-annulus 23 is preferably constructed in the form of a split ring having a stiffening rib or web 24 surrounding its periphery. At the bottom of the web 24 is a circular boss 25, see also Fig. 1, through which projects a stud 26 for securing the brake-annulus 23 to the side of the bearing 4 to hold it from turning with the clutch-sleeve 6. As here illustrated the stud 26 is screwed into a boss on a member 27 which is fastened to the side of the bearing 4 by the screws 28. The annulus 23 is split at 29 and formed at one side thereof with a lug 30 through which is threaded a stud 31. The end of the stud 31 bears against a lug 32 on the opposite side of the split in the annulus and by turning the stud the split 29 may be widened to expand the diameter of the annulus. The stud 31 is grooved or fluted longitudinally at 33 and a pointed spring-plunger 34 is arranged to engage the grooves to hold the stud from unwarranted turning. The plunger 34 is held in a vertical bore 35 in the lug 30 and is pressed outwardly to engage its point with the grooves 33 in the stud 31 by means of a compression-spring 36.

Referring to Figs. 4 and 5, the expansible clutch-ring 20 and brake-ring 22 are preferably constructed with an outer split annulus having inwardly-projecting, radial fingers or lugs 39. The inner ends of the lugs 39 are fitted to bear on the periphery of the enlarged hub 8 of the sleeve 6 to support the rings therefrom, while allowing for a slight sliding motion thereon under the expansion and contraction of the rings. The rings 20 and 22 are split at 40 and 42 respectively with the cuts extending at an angle to the axial plane thereof. It will also be noted from Figs. 4 and 5, which are views looking in the same direction, that the two cuts 40 and 42 are inclined in opposite directions, this being for a purpose as later explained.

The clutch-ring 20 and brake-ring 22 are caused to expand and contract, to alternately effect the clutching and braking action, by means operating with a wedging action between their split ends. For this purpose I employ a rockable lever 45 which is held in a slot 46 cut into the side of the hub 8 of the sleeve 6, and pivoted on a cross-pin 47 driven through a hole 48 in the hub. The lever 45 is of double bell-crank type having a central arm 49 projecting into the space between the split ends of the clutch-ring 20 and brake-ring 22, and of sufficient width to overlap both rings, see Figs. 1, 4 and 5. The sides of the arm 49 bear against hardened pins or studs 50, 51 and 52, 53 held in the ends of the rings 20 and 22. The pins 50, 51, 52, 53 are formed with heads 54 seated in counterbores in the ends of the rings 20, 22 to prevent their displacement in one direction, and the opposite faces of the rings abut the ends of the studs to hold their heads in the counterbores. It will be observed by reference to Figs. 4 and 5 that the heads of the pins 50, 51, 52, 53 are flatted off on their sides to provide that the arm 49 shall bear against the bodies of the pins throughout the major portion of their length. It is also called to attention that the opposite pins of each pair 50, 51 and 52, 53 are arranged in offset relation on the outer and inner ends of the split portion of the rings 20 and 22.

The lever 45 has two opposite arms 55 and 56 projecting from its central hub at right-angles to the arm 49. The arms 55 and 56 are formed on the bottom with rounded toe-portions 57 and 58 adapted to be engaged by the ends of plunger-pins 59 and 60 respectively. The plunger 59 is fitted to slide in a bore 61 in the hub 8 of the sleeve 6 and is provided with a pocket 62 for receiving a coiled spring 63 which bears against the bottom of the bore 61. The spring 63 tends to force the plunger 59 against the toe 57 on the arm 55 of the lever 45 to rock the latter in the direction indicated by the arrow x, Fig. 4. The plunger 60 slides in a bore 64 in the hub 8 with its end bearing against the toe 58 on the arm 56 of the lever 45. The plunger 60 is slid outwardly to rock the lever 45 in the direction indicated by the arrow y, Fig. 5, by means of a rockable pawl 65 to be next described.

The pawl 65 is shown in detail in Fig. 3 and is constructed with a cylindrical hub or bearing-stud 66 fitted to turn in a longitudinal bore 67 which intersects the bore 64 in the hub 8 of the sleeve 6. The hub 66 is formed with a cut 68 extending part way across its top, but leaving an upstanding abutment or ledge 69 at its end, see Figs. 4 and 5. The edge of the ledge or abutment 69 is rounded off to adapt it to ride across the end of the plunger-pin 60 in the manner of a cam or eccentric whereby to force the pin outwardly to rock the lever 45 against the action of the spring-plunger 59 in the manner and for the purpose as hereinafter more fully explained.

Referring now to Figs. 1 and 2, the hub or bearing-stud 66 projects into its bore 67 from the right-hand face of the flange or disk 9 on the sleeve 6. This face of the disk 9 is scored with an annular groove 70, and further cut away at 71, to provide a seat for the pawl 65 which projects from the end of the hub 66. The pawl 65 is thus housed within the rim of the disk or flange 9 and is held in place by the end of the bearing 4 which abuts the face of the disk.

The pawl 65 is rocked to project the plunger 60 against the clutch and brake-ring controlling-lever 45 by means of a sliding stop-plunger or shift-rod 75. The rod 75 may be mounted to slide in a bore in the bearing 4, see Fig. 1, or it might be supported in a separate bearing, with its end adapted to enter the annular groove 70 in the flange 9 whereby to cause it to make contact with the side of the pawl 65 to rock the latter as it rotates with the sleeve 6. The rod 75 may be operated from a spring or weight upon the release of a detent, as is usual in various types of machine stop-motions, or it may be shifted manually, through the medium of a hand- or foot-lever as is sometimes employed for the purpose.

The method of operation of the invention in its present embodiment is as follows: The pulley 2 is driven by a belt from its prime-mover or source of power, or this element might be constructed in the form of a gear or sprocket to be rotated from the usual means. With the parts of the device in the relation shown in Fig. 4 the spring-plunger 59 is forced against the arm 55 of the lever 45 to rock the latter in the direction indicated by the arrow x. Under this action the arm 49 of the lever 45, which bears against the pins 50 and 51, wedges the two ends of the clutch-ring 20 apart whereby to expand its diameter to cause it to frictionally grip the interior of the clutch-annulus 18. The ring 20 being rotatively held to the clutch-sleeve 6 by the lever 45 pivoted on the hub 8 of the sleeve, it is obvious that the engagement between the ring and the clutch-annulus 18 of the pulley 2 will cause the latter to turn the sleeve with it, whereby the shaft 3 keyed to the sleeve is driven therefrom.

It will be understood that with the clutch engaged as above explained the shift-rod or stop-plunger 75 is withdrawn within the bearing 4 so as to be removed from interference with the stop-pawl 65. The pawl 65 will therefore be held in the position illustrated by the dotted lines in Figs. 2 and 4 under the pressure of the plunger 60 on its abutment 69. Furthermore, the pressure of the opposite spring-plunger 59 on the lever 45, which tends to rock the latter in the direction indicated by the arrow x, Fig. 4, has a tendency to cause the arm 49 to assume a position coincident with the inclined slot in the brake-ring 22. Stated another way, the arm 49 of the lever 45 will lie substantially parallel with the sides of the split in the brake-ring 22, see dotted lines Fig. 4, and consequently this latter ring will be released so that its inherent spring tendency will cause it to contract to maintain its periphery free from engagement with the brake-annulus 23. Only a slight clearance is required between the brake-ring 22 and the enclosing brake-annulus 23 to allow the ring to rotate freely, and no attempt has been made to illustrate this clearance in the drawings except in Fig. 1. It will be understood, however, that when the clutch-ring 20 is engaged with the clutch-annulus 18 the brake-ring 22 will be released from the fixed brake-annulus 23 so that the sleeve 6 will rotate freely without resistance.

When it is required to stop the machine the rotation of the shaft 3 is arrested in the manner as next explained: The shift-rod 75 is slid to the left, as viewed in Fig. 1, to project its end into the groove 70 in the flange 9 on the sleeve 6. Should the rod 75 be shifted at the instant the pawl 65 is passing its end, then the rod will simply ride across the pawl until allowed to enter the groove 70. Now, as the disk 9 continues its rotation in the direction indicated by the arrow z, Fig. 2, the pawl 65 is carried around until its side is engaged by the end of the rod 75 to cause it to be rocked thereby as indicated by the dotted and full lines in Fig. 2. Referring now to Fig. 5, the rocking of the pawl 65 in this manner rotates its hub 66 to cause the abutment 69 on its side to act against the plunger 60 to project the latter against the arm 56 of the lever 45. This action rocks the lever 45 in the direction indicated by the arrow y, Fig. 5, against the force of the spring-plunger 59 which will therefore be retracted in its bore 61. Now, as the lever 45 is rocked in this manner its arm 49 will be tilted across the slit in the brake-ring 22 to pry the ends of the ring apart through the action of the arm on the studs 52 and 53. The spreading of the ends of the ring 22 causes it to expand in diameter whereby its periphery will frictionally engage the interior of the brake-annulus 23 to effect the braking action. This action is positive as derived from the force of momentum of the rotating parts of the device, and the greater the speed of the driven elements, and the power applied to drive the latter, then the greater the force of the braking action. Before the braking-device comes into action in the manner as just described the clutch-means will be released. That is to say, as the lever 45 is rocked to expand the brake-ring 22 its arm 49 is tilted back from the position shown in Fig. 4, and being carried into substantially parallel relation with the sides of the split in the clutch-ring 20 the latter will be released to allow it to contract to disengage it from the clutch-annulus 18. Stated briefly, the clutch-ring 20 is released and the brake-ring 22 expanded practically simultaneously; and consequently as the driving action between the pulley 2 and sleeve 6 ceases the braking action between the fixed brake-annulus 23 and the sleeve is applied. Moreover, as the brake takes its power from the momentum of the moving parts there is what might be termed a dual action of the braking-means to check the rotation of the driven-element; the force of momentum being absorbed through the brake and converted into power to actuate the latter. Through this ingenious arrangement the driven-element is quickly brought to a stop without jar or shock and with a minimum strain on the mechanism.

When it is desired to start the operation of the machine again it is only necessary to withdraw the shift-rod 75 from engagement with the pawl 65. The freeing of the pawl 65 releases the pressure of the plunger 60 on the lever 45, whereby the opposite spring-plunger 59 acts to tilt the lever to release the brake-ring 22, while at the same time acting to expand the clutch-ring 20. The clutch-ring 20 is expanded by the resilient action of the spring 62 on the plunger 60 and consequently its engagement with the clutch-annulus 18 will be gradual so that the driven-element is started to rotate slowly without shock or strain. As the rotating parts gain speed the centrifugal force acting on the clutch-ring 20 tends to further expand the ring to increase its clutching effect. Moreover, as the driving-element or pulley 2 turns in the direction indicated by the arrow z in Fig. 4, the engagement of its annulus 18 with the clutch-ring 20 will have a tendency to cause the right-hand end of the ring to act on the lever 45 to rock it still further in the direction indicated by the arrow x. This action increases the wedging effect of the lever to spread the ends of the clutch-ring 20 apart whereby to augment its gripping action on the clutch-annulus 18. In this way the lever-operating spring 63 is relieved of undue pressure after the parts have been carried into driving engagement; the function of the spring being merely to initiate the action of the lever 45 in starting the clutch action.

It will be observed from the above that my improvement provides a particularly simple, compact mechanism with the clutch- and brake-devices self-contained and completely enclosed within the other parts to protect them from dirt and dust or outside interference with their operation. Both the clutching and braking means operate quickly and efficiently for the desired purpose and with a smooth even action which prevents shock and strain on the parts. Moreover, the brake is actuated from the cumulative power derived from the momentum of the going parts without requiring springs, weights or other separate means to effect its action. The control of the driven-member is easily regulated by the shifting of a single element and practically instantaneous stopping is effected at any given point in its rotation. The device is adapted for a wide range of uses and is adjustable for wear on the braking-surfaces, while being proof against derangement or getting out of order. It is also noted that while in the present embodiment of the invention the clutch- and brake-devices are coordinated to operate in unison, either of the devices could be employed separately for its particular purpose, and my invention contemplates such individual application of the means shown.

Various modifications may be made in the structure and arrangement of the parts of the device as herein shown without departing from the spirit or scope of the invention.

Therefore without limiting myself to the exact embodiment of the apparatus as above set forth, I claim:

1. In a clutch-device, the combination with a driving-member, of a member adapted to be driven therefrom, one of said members being provided with a clutch-annulus, a split clutch-ring carried by the other member and adapted to frictionally engage the clutch-annulus, a rockable lever having an arm projecting between the opposite ends of the clutch-ring to adapt it to wedge against both ends thereof to expand said ring to cause its engagement with the annulus, and resiliently-operated means for rocking the lever.

2. In a clutch-device, the combination with a driving-member, of a member adapted to be driven therefrom, one of said members being provided with a clutch-annulus, a split clutch-ring carried by the other member and adapted to expand to engage the clutch-annulus, a rockable lever pivoted on the second member and provided with an arm projecting radially into the space between the ends of the clutch-ring to adapt it to wedge against both ends thereof and resilient means to rock the lever to expand the clutch-ring to cause it to frictionally engage the clutch-annulus.

3. In a clutch-device, the combination with a driving-member, of a member adapted to be rotated therefrom, one of said members being provided with a clutch-annulus, a split clutch-ring carried by the other member to adapt it to engage the clutch-annulus, a lever pivoted on the second member and provided with an arm projecting into the space between the ends of the clutch-ring to adapt it to wedge against both ends thereof to spread them apart to expand the ring, and resilient means operating on the lever to maintain the clutch-ring normally expanded in engagement with the annulus.

4. In a clutch-device, the combination with a driving-member, of a member adapted to be driven therefrom, one of said members being provided with a clutch-annulus, a split clutch-ring carried by the other member to adapt it to frictionally engage the clutch-annulus, a rockable lever provided with an arm projecting into the space between the ends of the clutch-ring to adapt it to wedge against both ends thereof to cause expansion of the ring, resilient means for actuating the lever to operate the clutch-ring to engage it with the clutch-annulus, and means for positively actuating the lever to cause it to release the clutch-ring.

5. In a clutch-device, the combination with a driving member, of a member adapted to be driven therefrom, a split clutch-ring carried by one member and engageable with the other member to effect the driving connection, a spring-controlled lever having an arm projecting into the space between the opposed ends of the clutch-ring and bearing against both ends of said ring to expand the latter to effect its clutching action, positive means for contracting the ring to release it from driving engagement, and means adapted to be carried into position to operate the releasing means from its motion with the clutch-members.

6. In a clutch-device, the combination with a driving- and a driven-member, of a split clutch-ring carried by one member and adapted to engage the other member to effect the driving connection, a resiliently-operated lever having an arm projecting between the opposed ends of the clutch-ring and bearing against both ends of said ring to cause the latter to expand to effect the clutching action, and means adapted to be carried into position to act upon said resiliently-operated means to cause the release of the clutch-ring.

7. In a clutch-device, the combination with a driving- and a driven-member, of a split clutch-ring carried by one member and adapted to engage the other member, a rockable lever for operating on the split ends of the clutch-ring to effect the clutching action, resilient means for rocking said lever, a pawl for rocking the lever against the action of the resilient means, and means adapted to be carried into position to operate the pawl to cause it to actuate the lever to release the clutch-ring.

8. In a clutch-device, the combination with a driving- and a driven-member, of a split clutch-ring carried by one member and adapted to engage the other member, a rockable lever for acting on the split ends of the clutch-ring to effect the clutching action, a spring-plunger for rocking the lever in one direction, a second plunger for rocking the lever in the opposite direction, a rockable pawl for operating the second plunger, and means adapted to be carried into position to rock the pawl.

9. In a clutch- and brake-device, the combination with a driving-member, of a member adapted to be driven therefrom, clutch-devices for connecting the members, braking-means for arresting the motion of the driven-member, and means common to both the clutch-devices and braking-means to effect alternately opposite action thereof whereby the clutch-devices are released and the braking-means simultaneously rendered active and vice versa.

10. In a clutch- and brake-device, the combination with a driving-member and a driven-member, of clutch-devices for operatively connecting said members, braking-means for arresting the operation of the driven-member, controlling-means operating to release the clutch-devices and simultaneously actuate the braking-means and vice versa, and means adapted to be set to actuate the controlling-means.

11. In a clutch- and brake-device, the combination with a driving-member, of a member adapted to be driven therefrom, clutch-devices for connecting said members, a fixed brake-annulus, a split brake-ring carried by the driven-member and adapted to frictionally engage the brake-annulus, means adapted to operate on the split ends of the brake-ring to cause its engagement with the annulus, and means to release the clutch-devices and simultaneously actuate the brake-operating means.

12. In a clutch- and brake-device, the combination with a driving-member and a driven-member, of a clutch-ring carried by one member and adapted to connect it with the other member, a brake-ring carried by the driven-member, a fixed brake-annulus adapted to be engaged by the brake-ring, and means operating on both rings to cause alternate opposite expansion and contraction thereof whereby when the brake-ring is released the clutch-ring will become operative and when the clutch-ring is released the brake-ring will become operative.

13. In a clutch- and brake-device, the combination with a driving-member and a driven-member, of a pair of split rings carried by said members, means to expand one ring and simultaneouly contract the other ring, a clutch-annulus on one of the members adapted to be engaged by one of the rings to effect driving engagement with the other member, and a fixed brake-annulus adapted to be engaged by the other ring to effect a braking action on the driven-member.

14. In a clutch- and brake-device, the combination with a driving-member and a driven-member, of a split clutch-ring for effecting driving engagement between the members, a split brake-ring, a brake-annulus adapted to be engaged by the brake-ring to cause braking action on the driven-member, a lever operable on the split ends of both rings to cause expansion of one ring and contraction of the other, and means to rock the lever in opposite directions.

15. In a clutch- and brake-device, the combination with a driving-member and a driven-member, of a split clutch-ring for effecting driving engagement between the members, a split brake-ring, a brake-annulus adapted to be engaged by the brake-ring to cause braking action on the driven-member, a lever operable on the split ends of both rings to cause expansion of one ring and contraction of the other, resilient-means for rocking the lever in one direction, and positively-acting means to rock the lever in the opposite direction.

16. In a clutch- and brake-device, the combination with a driving-member and a driven-member, of a split clutch-ring for effecting driving engagement between the members, a split brake-ring, a brake-annulus adapted to be engaged by the brake-ring to cause braking action on the driven-member, a lever operable on the split ends of both rings to cause expansion of one ring and contraction of the other, resilient-means for rocking the lever in one direction, and means adapted to be carried into position to rock the lever in the opposite direction.

17. In a clutch- and brake-device, the combination with a driving-member and a driven-member, of a split clutch-ring for effecting driving engagement between the members, a split brake-ring, a brake-annulus adapted to be engaged by the brake-ring to cause braking action on the driven-member, a lever operable on the split ends of both rings to cause expansion of one ring and contraction of the other, resilient-means for rocking the lever in one direction, a pawl for rocking the lever in the opposite direction, and means adapted to be carried into position to actuate the pawl from its motion with the driving- and driven-members.

18. In a clutch-device the combination with a driving-member and a driven-member, of a split clutch-ring carried on one member and adapted to engage the other member to effect driving engagement therebetween, said ring having the sides of its split ends disposed obliquely to a radial plane intersecting therewith, a rockable lever having an arm arranged between the ends of the ring, and means to rock the lever in one direction to expand the ring and in the opposite direction to contract the ring.

19. In a clutch- and brake-device, the combination with a driving-member and a driven-member, of a split clutch-ring for effecting driving connection between the members, a split brake-ring, a brake-annulus adapted to be frictionally engaged by the brake-ring, said rings arranged adjacent and having their split ends disposed at opposite angles to the radial plane intersecting therewith, and a lever having an arm projecting between the split ends of the rings and adapted to be rocked in opposite directions to expand one ring and contract the other.

In testimony whereof I affix my signature.

ARTHUR H. MAYNARD.